United States Patent
Zhu et al.

(10) Patent No.: US 10,971,923 B2
(45) Date of Patent: Apr. 6, 2021

(54) HOT SWAP INRUSH CURRENT LIMITER CIRCUIT

(71) Applicant: CISCO TECHNOLOGY, INC., San Jose, CA (US)

(72) Inventors: Xiqun Zhu, Cupertino, CA (US); Sung Kee Baek, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 247 days.

(21) Appl. No.: 16/113,655

(22) Filed: Aug. 27, 2018

(65) Prior Publication Data

US 2020/0067305 A1    Feb. 27, 2020

(51) Int. Cl.
*H02H 9/00* (2006.01)
*H02H 9/02* (2006.01)

(52) U.S. Cl.
CPC .......... *H02H 9/001* (2013.01); *H02H 9/025* (2013.01)

(58) Field of Classification Search
CPC ............................ H02H 9/001; H02H 9/025
USPC ..................................................... 361/93.9
See application file for complete search history.

(56) References Cited

U.S. PATENT DOCUMENTS

| 5,079,455 | A  | * | 1/1992  | McCafferty | ........ | H03K 17/0822 |
|           |    |   |         |            |          | 323/908      |
| 5,122,724 | A  |   | 6/1992  | Criss      |          |              |
| 5,374,887 | A  |   | 12/1994 | Drobnik    |          |              |
| 6,703,889 | B2 |   | 3/2004  | Dodson     |          |              |
| 9,281,758 | B1 | * | 3/2016  | Wang       | ..........| H02M 7/062   |
| 2014/0198423 | A1 | * | 7/2014 | Anand    | ..........| H02H 7/222   |
|           |    |   |         |            |          | 361/93.9     |
| 2015/0103459 | A1 | * | 4/2015 | Von Allmen | ......... | H01H 47/002 |
|           |    |   |         |            |          | 361/93.9     |

OTHER PUBLICATIONS

Mark Person, "Current limiting key to hot-swap circuit protection", EETimes.com, Sep. 18, 2002.

* cited by examiner

*Primary Examiner* — Dharti H Patel
(74) *Attorney, Agent, or Firm* — Cindy Kaplan

(57) ABSTRACT

In one embodiment, a hot swap inrush current limiter circuit includes a pair of paths connecting an input and a load, a first capacitor connected in series with a switch between the paths, a first resistor connected to one of the paths and to a junction between the switch and the first capacitor, a second capacitor connected in series with a second resistor between the paths, with a gate of the switch connected to a junction between the second capacitor and the second resistor, a first diode connected in parallel with the second capacitor, and a second diode connected in parallel with the second resistor to allow for discharge of the second capacitor when input power is off. A method is also disclosed herein.

20 Claims, 5 Drawing Sheets

HOT SWAP INRUSH CURRENT LIMITER CIRCUIT

TECHNICAL FIELD

The present disclosure relates generally to electronic circuits, and more particularly, to a hot swap inrush current limiter circuit.

BACKGROUND

Modular electronic systems are designed to provide flexibility to configure systems as per user needs. These systems typically have multiple slots to accommodate a variety of modules. Most of these modules can be replaced with the latest product upgrades without disturbing normal operation of the system (i.e., hot swappable). This feature allows modules to be plugged in and removed from the system while the system is powered and in service. System reconfiguration, maintenance, and trouble-shooting can therefore be performed without shutting down the entire system. However, inrush currents when making these changes may be relatively high.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
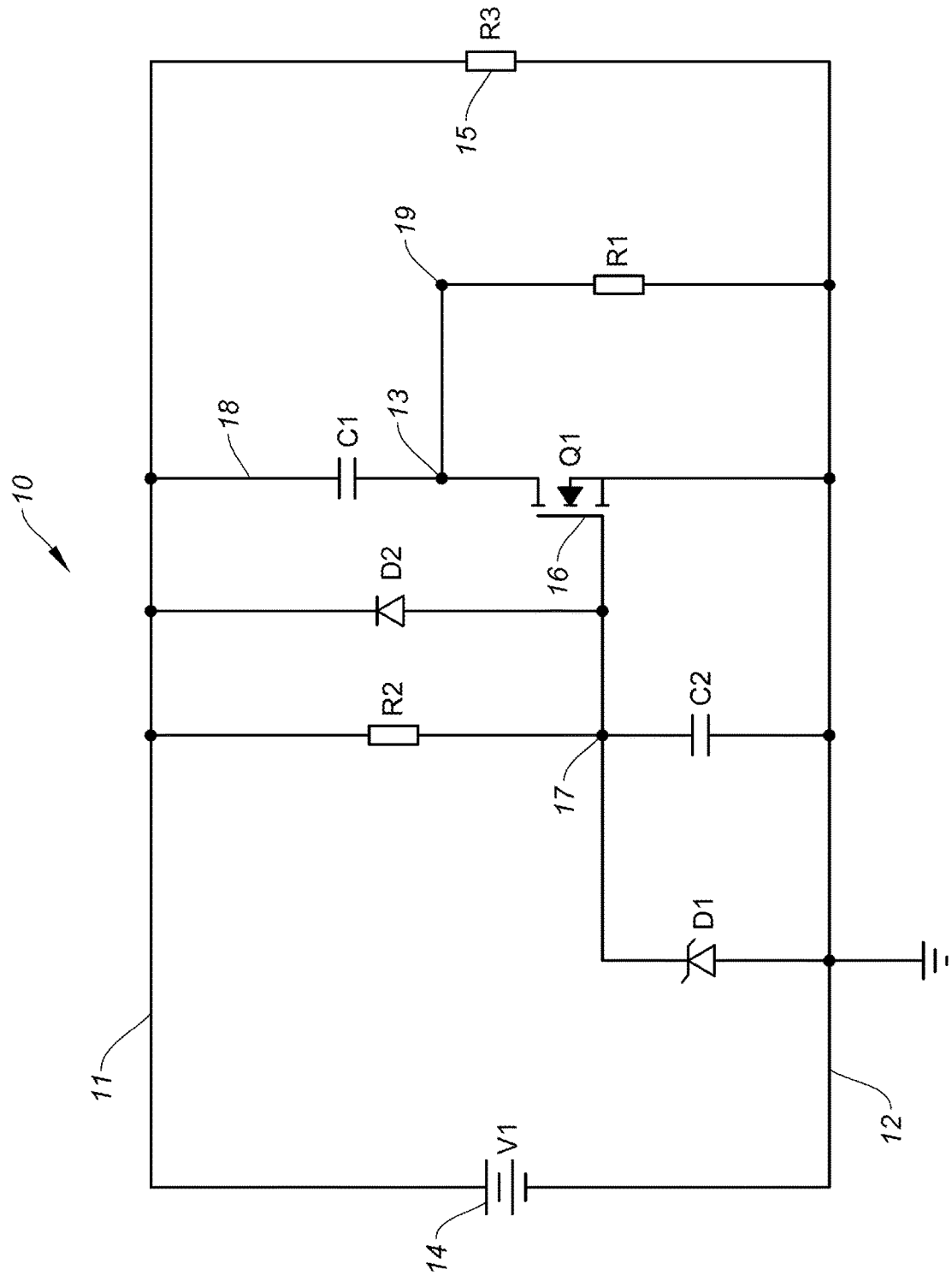
FIG. 1 illustrates an example of a hot swap circuit with inrush current limiting, in accordance with one embodiment.

In one embodiment, a hot swap inrush current limiter circuit generally comprises a pair of paths connecting an input and a load, a first capacitor connected in series with a switch between the paths, a first resistor connected to one of the paths and to a junction between the switch and the first capacitor, a second capacitor connected in series with a second resistor between the paths, with a gate of the switch connected to a junction between the second capacitor and the second resistor, a first diode connected in parallel with the second capacitor, and a second diode connected in parallel with the second resistor to allow for discharge of the second capacitor when input power is off.

In another embodiment, a method for limiting inrush current generally comprises charging a first capacitor through a first resistor, charging a second capacitor through a second resistor, and turning on a switch in response to the second capacitor charging to a switch turn on level. The first resistor is bypassed upon closing the switch. The first capacitor provides a holdup function in a hot swap circuit and a diode allows the second capacitor to be discharged to turn off the switch when input power is cycled off.

In yet another embodiment, an inrush current limiting circuit generally comprises an input voltage and a load corresponding to a function circuit of a hot swap module, a first capacitor charged through a first resistor and operable to provide power holdup for the function circuit, a second capacitor charged through a second resistor and operable to turn on a switch upon reaching a specified charge, the switch providing a bypass of the first resistor, and a diode for discharging the second capacitor during an off cycle of the input voltage.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

With the increasing importance of network devices such as computer servers, network switches, and Internet routers, uninterrupted service is very important. Modular network devices are often configured to allow for update or replacement of modules without interrupting operation of the rest of the system. For example, during operation of the network device, modules may need to be added, removed, or replaced while the system is powered and in service. This feature is referred to hot swap. Implementation of the hot swap feature, however, often leads to relatively high inrush currents.

Electronic function circuits need holdup time, which keeps the circuit functioning for a short period of time (e.g., a few milliseconds to several tens of milliseconds after input power is down). This holdup time is needed to maintain circuit operation continuity if the input power is interrupted or has a short glitch, or to allow the function block to be shut down in a controlled manner for system restorability and to avoid damage to the electrical circuits. This holdup time may be implemented by bulk capacitors, which may be charged when input power is present and discharged to maintain downstream circuit operation for a short time (e.g., tens of milliseconds). The capacitance of these capacitors is typically large to hold sufficient energy. Depending on the power consumption of downstream circuits and the holdup time needed, the holdup bulk capacitor may range from tens to hundreds µF (microfarads), or even larger. Protection is thus needed against large inrush currents for a hot swap circuit.

The embodiments described herein limit the inrush current for a hot swap circuit. The circuit does not need any firmware control and eliminates the need for switches located in a main power input path, thereby reducing system complexity and cost and preventing thermal problems, which provides improved reliability.

Referring now to the drawings, and first to FIG. 1, an example of a hot swap inrush current limiter circuit, generally indicated at 10, is shown in accordance with one embodiment. The system operates to prevent a large inrush current from a power source during module replacement in an operating network device. In the example shown in FIG. 1, the circuit 10 comprises a pair of paths (connection paths) 11, 12 between an input voltage 14 (V1) and a load 15 (R3). Resistor R3 simulates the total load resistance of a function block and generally corresponds to a function circuit of a hot swap module. The circuit further includes resistors R1 (first resistor), R2 (second resistor), capacitors C1 (first capacitor), C2 (second capacitor), diodes D1 (first diode), D2 (second diode) and a switch Q1.

As described in detail below, each capacitor C1, C2 is charged by a corresponding resistor R1, R2 when power is applied at V1. The switch Q1 is initially off (open) and turned on (closed) when capacitor C2 is charged. Resistor R1 provides inrush current limiting and is bypassed when switch Q1 turns on, at which time capacitor C1 serves a holdup function. The values of capacitor C1 and resistor R1 may be chosen based on a circuit holdup requirement. The values of capacitor C2 and resistor R2 may be selected based on a desired circuit startup time. Diode D1 is provided in the circuit to protect a gate 16 of the switch Q1. Diode D2 allows the capacitor C2 to be discharged fast through the second diode D2 to turn off the switch Q1 and protect the circuit 10 from inrush current when power is off during momentary on-off cycling during a hot swap process.

In the example shown in FIG. 1, the first capacitor C1 is connected in series with the switch Q1 (switch drain terminal) between the two paths (first path) 11, (second path) 12 connecting the power input 14 (V1) and load (R3) 15. The first resistor R1 is connected to the second path 12 and to a junction 13 between the switch Q1 (Q1 drain) and the first capacitor (buck capacitor) C1. The second capacitor (gate capacitor) C2 and the second resistor R2 are connected in series between the pair of paths 11, 12, with a gate 16 of the switch Q1 connected to a junction 17 between the second capacitor C2 and the second resistor R2. The first diode (Zener diode) D1 is connected in parallel to the second capacitor C2 and protects the gate of the switch Q1 from excessive voltage in normal operation. The second resistor R2 and the second diode D2 are connected in parallel. The switch Q1 may comprise a MOSFET (metal-oxide-semiconductor field-effect-transistor) or other suitable component operable to control the flow of current. The switch Q1 is automatically controlled through charge (and discharge) of capacitor C2 and is not located in the main power input path.

The first resistor R1 and the first capacitor C1 are operable to provide inrush current limiting and a circuit power holdup for the electronic function circuit. The second resistor R2 and the second capacitor C2 are operable to turn on the switch Q1 upon the second capacitor C2 reaching a specified charge (switch turn on charge). When the switch Q1 is turned on, it provides a bypass of the first resistor R1 (i.e., shortens R1 and grounds the negative side of C1).

The second diode D2 discharges the second capacitor C2 during an off cycle of the input voltage, which may occur during a hot swap process when mechanical insertion may cause some momentary cycling (e.g., on-off-on-off-on status) before the module is stably inserted. When the off cycle occurs, input power is off and the second capacitor C2 is discharged quickly through diode D2 and load R3, which is a small value, to turn off the switch Q1. When the next on cycle occurs, the switch Q1 is discharged and off. The inrush current goes through C1-R1 and is limited by the first resistor R1.

It is to be understood that the circuit shown in FIG. 1 is only an example and that other arrangements or combinations of components (e.g., resistors (R1, R2), capacitors (C1, C2), diodes (D1, D2), or switch (Q1) may be used that provide inrush current limiting for a hot swap circuit, without departing from the scope of the embodiments. Also, the values described herein for the resistors and capacitors are only examples and other values may be used.

The hot swap inrush current limiter circuit 10 may be used in any type of network device (e.g., server, router, switch, gateway, controller, edge device, access device, aggregation device, core node, intermediate node, or other network device). The network device may operate in the context of a data communications network including multiple network devices and may communicate over one or more networks.

Figure 2:
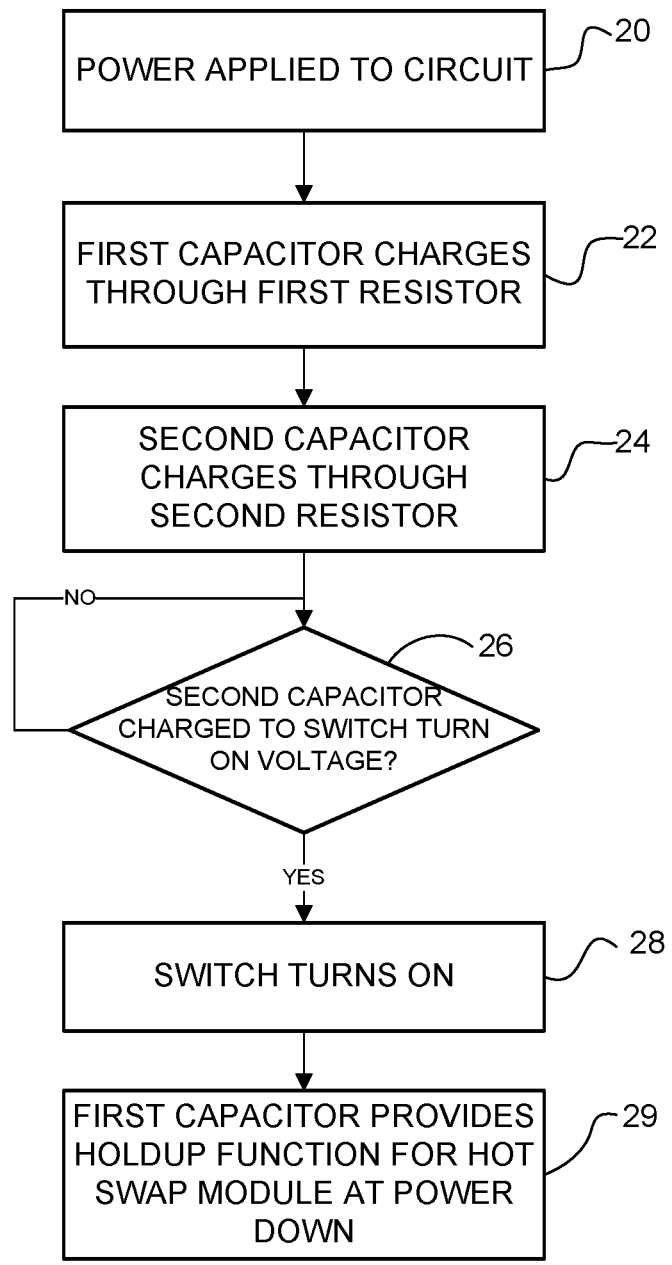
FIG. 2 is an overview of a process for operating the hot swap inrush current limiter circuit of FIG. 1, in accordance with one embodiment.

FIG. 2 is a flowchart illustrating an overview of operation of the hot swap inrush current limiter circuit 10 shown in FIG. 1, in accordance with one embodiment. The switch Q1 is initially in its off state before power is applied to the circuit. At step 20, power is applied at input 14 when the hot swap function block is plugged in (FIGS. 1 and 2). The first capacitor C1 (buck capacitor) is charged slowly through the first resistor R1 to avoid a large inrush current (step 22). At the same time, the second capacitor C2 (gate capacitor for Q1) is charged through the second resistor at a slower speed than the first capacitor (R2>R1) (step 24). When the second capacitor is charged up to the switch Q1 turn on level (voltage) (step 26), the switch Q1 is turned on (i.e., switch is turned on (closed) in response to the second capacitor charging to the switch turn on level) and the first resistor is bypassed (negative side of first capacitor C1 grounded) (step 28). At this time the first capacitor C1 starts to serve the holdup function and is ready to provide holdup power for the function block (hot swap module) at power down (step 29).

When the main input power V1 is off or has a glitch, the second capacitor C2 can hold its voltage for a relatively long time due to the large value of the second resistor R2, the first capacitor C1 stays grounded on its negative side and the capacitor C1 can keep R3 (function circuit of the hot swap block) powered for the desired amount of time. The second diode D2 may be included to allow the second capacitor to be discharged to open the switch Q1 when input power is cycled off.

It is to be understood that the process described above with respect to FIG. 2 is only an example and that steps may be combined, added, or modified, without departing from the scope of the embodiments.

As previously noted, the values of the first capacitor C1 and the first resistor R1 are chosen based on the desired circuit holdup and inrush current limit. The values of the second capacitor C2 and the second resistor R2 are chosen based on the desired circuit start up time. If a smaller inrush current is desired, an R2-C2 time constant can be increased to provide more time for the first capacitor C1 to be charged up through the first resistor. The value of the first resistor R1 determines the initial charge current.

Figure 3:
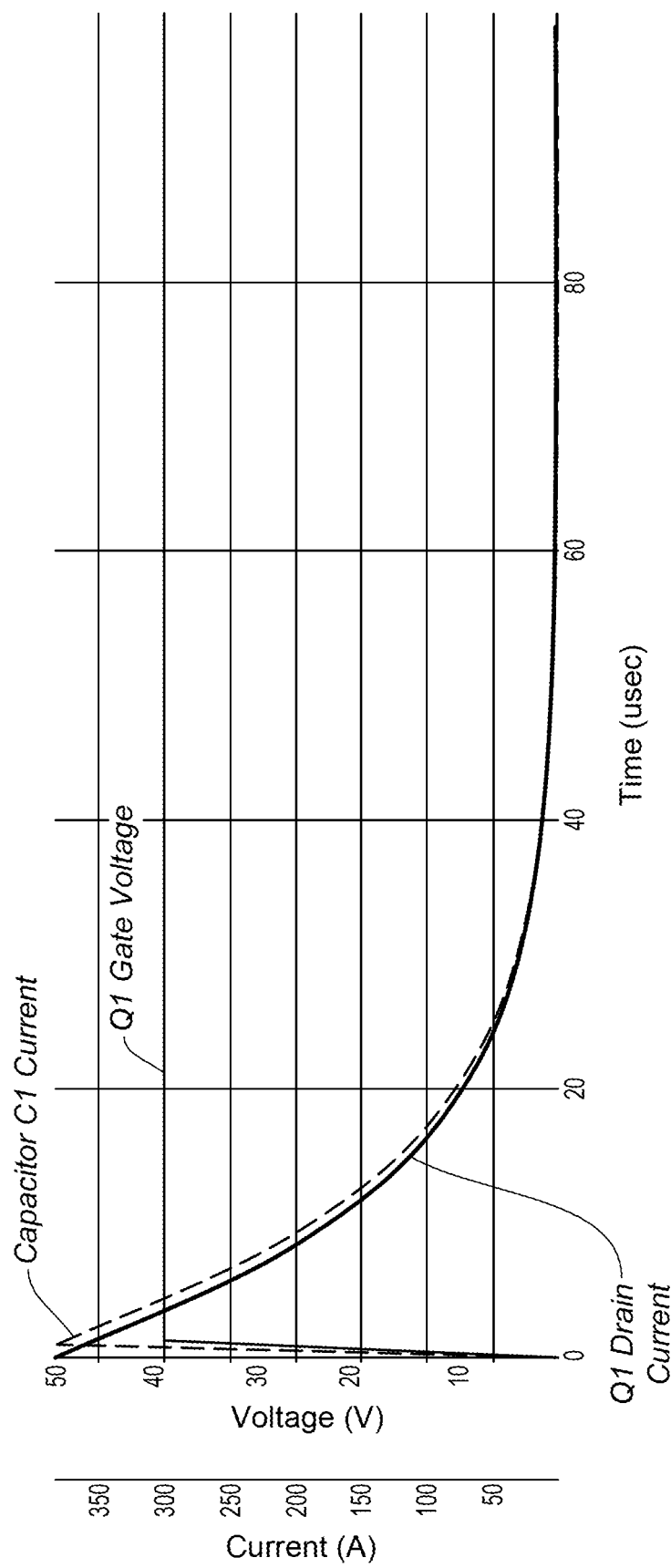
FIG. 3 is a graph illustrating an example of circuit operation without the inrush current limiting of FIG. 1.
Figure 4:
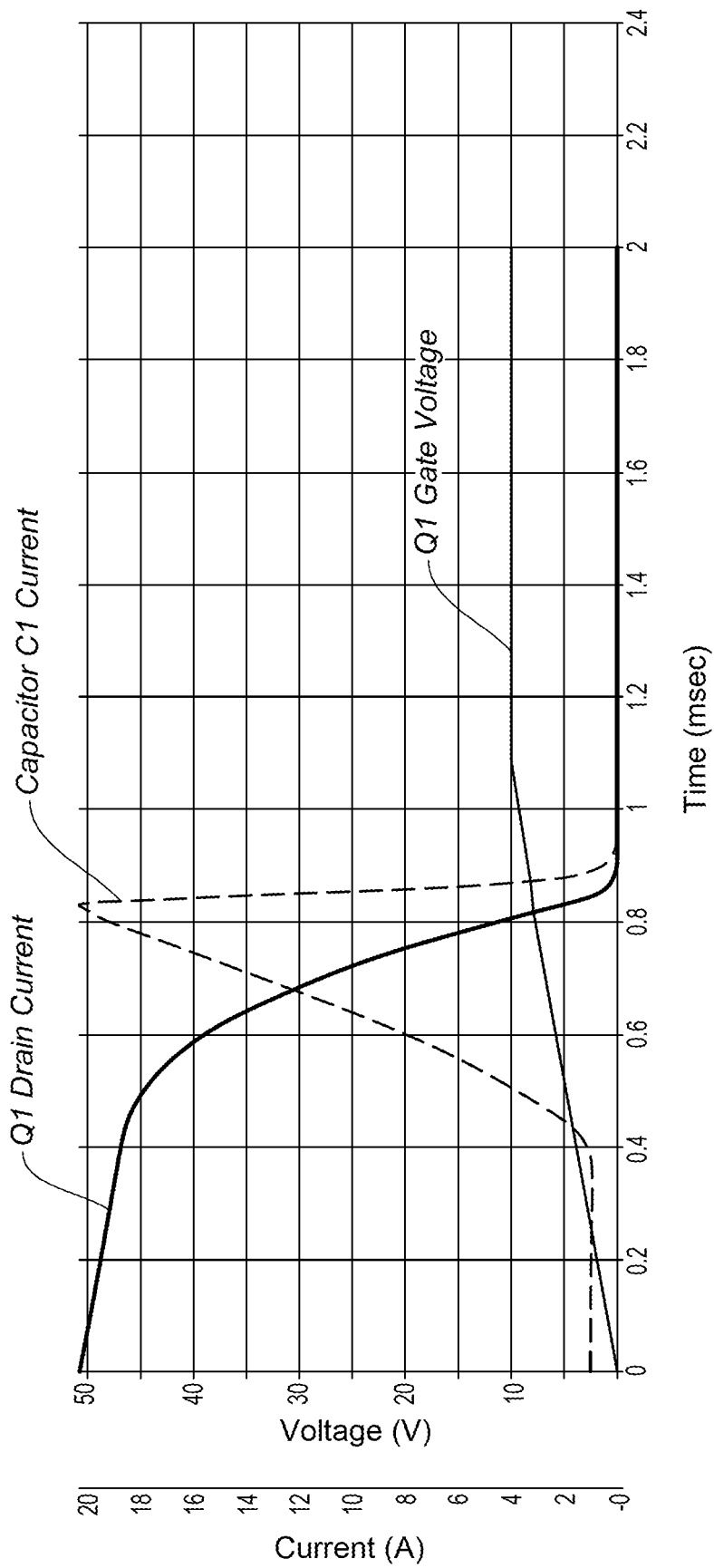
FIG. 4 is a graph illustrating an example of hot swap circuit operation with the inrush current limiting.
Figure 5:
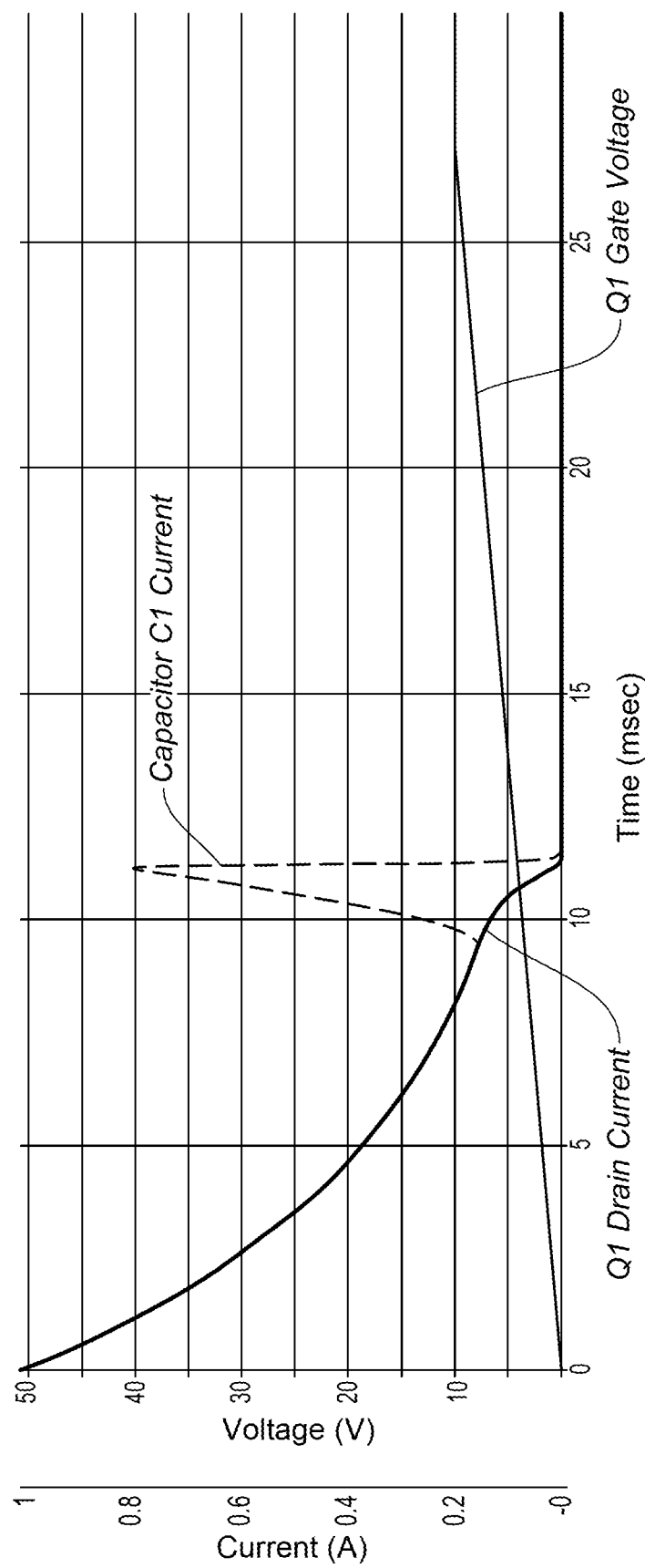
FIG. 5 is a graph illustrating another example of hot swap circuit operation with the inrush current limiting of FIG. 1.

Simulation examples for the circuit of FIG. 1 are shown in FIGS. 4 and 5. For comparison, FIG. 3 illustrates a simulation without the inrush current limiting provided by the circuit shown in FIG. 1. In the graphs shown in FIGS. 3, 4, and 5, current (A) and voltage (V) is plotted over time μsec (microsecond) in FIG. 3 and msec (millisecond) in FIGS. 4 and 5). The Q1 gate voltage (V) of switch Q1 (indicated at 16 in FIG. 1) is plotted over time along with the first capacitor C1 current (A) (indicated at 18 in FIG. 1) and switch Q1 drain current (A) (indicated at 19 in FIG. 1). These simulations were performed without the second diode D2 included in the circuit.

In each graph, the power source V1 is connected or switched on at t=0. In FIG. 3, in which there is no inrush current limiting, there is a large inrush current surge, whereas in FIGS. 4 and 5, the inrush current is limited as indicated by the capacitor C1 current. FIGS. 4 and 5 also illustrate the change in Q1 drain current as compared to FIG. 3. The Q1 gate voltage is limited by the Zener diode D1, as previously noted.

Referring first to FIG. 3, the second resistor R2 is set to 1 ohm, effectively eliminating the inrush current limiting. In this example, the inrush current is very high (C1 current>380 A) under a set of conditions with C1=100 μF (microfarads), C2=47 nF (nanofarads), R1=50 ohm, and R2=1 ohm. As shown in the graph of FIG. 3, there is nothing to prevent the large inrush current when power is applied. In this situation, a spark may occur at high current levels when a module is plugged in.

Referring now to FIG. 4, R2 is increased to 100 kilo-ohms and the inrush current (capacitor C1 current) is reduced to around 20 A. As previously described, the gate capacitor C2 is charged through resistor R2 and after the capacitor C2 has been charged, switch Q1 closes, thereby allowing the first capacitor C1 to serve the holdup function. Further increase to the R2-C2 time constant value can suppress the inrush current to lower than the C1 charging current through R1 as shown in FIG. 5 and described below.

Referring now to FIG. 5, the inrush current (capacitor C1 current) is shown for R2=1 megohm and C2=120 nF. In this example, the inrush current is only around 800 mA (milli-amps), lower than the C1-R1 initial charging current of 1 A. The R1 value is doubled to 100 ohm, and the R2-C2 time constant value is adjusted accordingly, the inrush current can be lower than 0.5 A, if needed.

It is to be understood that the resistance and capacitance values used in the simulations shown in FIGS. 4 and 5 are only examples and other suitable values may be used to provide desired inrush current limits and circuit startup times, without departing from the scope of the embodiments.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A hot swap inrush current limiter circuit comprising:
a pair of paths connecting an input and a load;
a first capacitor connected in series with a switch between said pair of paths;
a first resistor connected to one of said paths and to a junction between the switch and said first capacitor;
a second capacitor connected in series with a second resistor between said pair of paths, with a gate of the switch connected to a junction between said second capacitor and said second resistor;
a first diode connected in parallel with said second capacitor; and
a second diode connected in parallel with said second resistor to allow for discharge of said second capacitor when input power is off.

2. The hot swap inrush current limiter circuit of claim 1 wherein said second resistor has a larger resistance value than said first resistor.

3. The hot swap inrush current limiter circuit of claim 1 wherein said first diode comprises a Zener diode operable to protect a gate of the switch.

4. The hot swap inrush current limiter circuit of claim 1 wherein the switch comprises a MOSFET (metal-oxide-semiconductor field-effect-transistor).

5. The hot swap inrush current limiter circuit of claim 1 wherein an increase in a resistance value of said second resistor reduces said inrush current.

6. The hot swap inrush current limiter circuit of claim 1 wherein a resistance value of said first resistor determines an initial charge current.

7. The hot swap inrush current limiter circuit of claim 1 wherein an increase in a time constant based on said second resistor and said second capacitor provides additional time for said first capacitor to be charged through said first resistor and reduces said inrush current.

8. The hot swap inrush current limiter circuit of claim 1 wherein discharge of said second capacitor turns off the switch when input power is off.

9. The hot swap inrush current limiter circuit of claim 1 wherein said second capacitor is charged through said second resistor and turns on the switch when charged and said first capacitor is charged through said first resistor before the switch is turned on.

10. A method for limiting inrush current comprising:
charging a first capacitor through a first resistor;
charging a second capacitor through a second resistor; and
turning on a switch in response to said second capacitor charging to a switch turn on level, wherein said first resistor is bypassed upon turning on the switch;
wherein said first capacitor provides a holdup function in a hot swap circuit and wherein a diode allows said second capacitor to be discharged to turn off the switch when input power is cycled off.

11. The method of claim 10 wherein another diode is in parallel with said second capacitor to protect a gate of the switch.

12. The method of claim 10 wherein an increase in a resistance value of said second resistor reduces said inrush current.

13. The method of claim 10 wherein a resistance value of said first resistor defines an initial charge current.

14. The method of claim 10 wherein an increase in a time constant based on said second resistor and said second capacitor provides additional time for said first capacitor to be charged through said first resistor and lowers said inrush current.

15. The method of claim 10 wherein said second resistor has a resistance value larger than a resistance value of said first resistor.

16. An inrush current limiting circuit comprising:
an input voltage and a load corresponding to a function circuit of a hot swap module;
a first capacitor charged through a first resistor and operable to provide power holdup for the function circuit of the hot swap module;
a second capacitor charged through a second resistor and operable to turn on a switch upon reaching a specified charge, the switch providing a bypass of said first resistor; and
a diode for discharging said second capacitor during an off cycle of said input voltage.

17. The inrush current limiting circuit of claim 16 further comprising a Zener diode for protecting a switch gate.

18. The inrush current limiting circuit of claim 16 wherein an inrush current limit of the circuit is increased by adjusting a time constant value based on said second resistor and said second capacitor.

19. The inrush current limiting circuit of claim 16 wherein said second resistor comprises a larger resistance value than said first resistor.

20. The inrush current limiting circuit of claim 16 wherein said first resistor defines an initial charge current of the circuit.

* * * * *